US007834082B2

(12) United States Patent
Haider et al.

(10) Patent No.: US 7,834,082 B2
(45) Date of Patent: Nov. 16, 2010

(54) POLYETHER-POLYSILOXANE POLYOLS

(75) Inventors: Karl W. Haider, Wexford, PA (US);
James Y. J. Chung, Wexford, PA (US);
Jeffrey F. Dormish, St. Clair, PA (US);
Rick V. Starcher, Monaca, PA (US);
Irene L. Yano, McKees Rocks, PA (US);
Edwin R. Hortelano, Moon Township, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 605 days.

(21) Appl. No.: 11/654,173

(22) Filed: Jan. 17, 2007

(65) Prior Publication Data

US 2008/0171829 A1 Jul. 17, 2008

(51) Int. Cl.
*C08L 83/00* (2006.01)

(52) U.S. Cl. .................. 524/588; 528/14; 528/16; 528/18; 528/27

(58) Field of Classification Search .......... 528/14; 524/588
See application file for complete search history.

(56) References Cited

U.S. PATENT DOCUMENTS

| | | | | |
|---|---|---|---|---|
| 2,834,748 | A | | 5/1958 | Bailey et al. .................. 260/42 |
| 2,917,480 | A | * | 12/1959 | Bailey et al. ................. 525/477 |
| 3,182,076 | A | | 5/1965 | Holdstock ................. 260/448.2 |
| 3,792,073 | A | | 2/1974 | Mahopac et al. ....... 260/448.8 R |
| 4,499,149 | A | * | 2/1985 | Berger ......................... 428/447 |
| 5,134,172 | A | * | 7/1992 | Bruyninckx et al. ......... 521/137 |
| 5,777,177 | A | * | 7/1998 | Pazos .......................... 568/679 |
| 5,856,369 | A | | 1/1999 | Jorgenson et al. |
| 5,880,245 | A | * | 3/1999 | Fujita et al. .................... 528/27 |
| 6,429,342 | B1 | * | 8/2002 | Clement et al. .............. 568/616 |
| 6,569,980 | B1 | * | 5/2003 | Masaoka et al. ............... 528/27 |
| 2002/0013427 | A1 | * | 1/2002 | Tsuji et al. ................... 525/523 |
| 2008/0045687 | A1 | * | 2/2008 | Nguyen et al. ................ 528/15 |

FOREIGN PATENT DOCUMENTS

| | | |
|---|---|---|
| EP | 485 637 B1 | 4/1997 |
| GB | 802688 | 10/1958 |
| WO | WO2006106362 | * 10/2006 |

OTHER PUBLICATIONS

Block Copolymers; Overview and Critical Survey, (month unavailable) 1977, A. Noshay and J.E. McGrath, p. 400-402 and 451, Siloxane-Alkylene Ether.
Encyclopedia of Polymer Science and Engineering, vol. 15, 2$^{nd}$ edition, (date unavailable) p. 243-244, Marks et al, "Silicones".

* cited by examiner

*Primary Examiner*—Randy Gulakowski
*Assistant Examiner*—Lindsay Nelson
(74) *Attorney, Agent, or Firm*—Robert S. Klemz; Noland J. Cheung

(57) ABSTRACT

A method of making a polyether-polydialkylsiloxane block copolymer is provided. The method comprises providing a mixture comprising at least one alkylene oxide and at least one silanol-terminated polydialkylsiloxane; and polymerizing the mixture in the presence of a double metal cyanide complex catalyst, and optionally in the presence of an aprotic solvent and/or an antioxidant. A polyether-polydialkylsiloxane block copolymer having a molecular weight of 150-50,000 g/mole and having a polydispersity index of 1.0 to 1.5 made by the above method is also provided.

23 Claims, No Drawings

POLYETHER-POLYSILOXANE POLYOLS

FIELD OF THE INVENTION

The present invention relates to polyether-polysiloxane polyols prepared from silanol-terminated polydialkylsiloxanes. Such polyols are useful in the preparation of adhesive compositions, particularly hot-melt adhesives, and low surface energy coatings.

BACKGROUND INFORMATION

Block copolymers of polysiloxanes and polyalkylene ethers(polyethers) are known in the art and have been prepared by various methods. They can be used as surfactants or as surface active monomers to modify the surface energy of polymers. Although a few of them are truly linear block copolymers, many of them would be more properly described as graft or "comb" copolymers.

Linear block copolymers of polysiloxanes and polyalkylene ethers have been prepared by reaction of difunctionally terminated polysiloxane oligomers with dihydroxyl terminated polyalkylene ethers. Examples of suitably terminated polysiloxanes used to prepare these block copolymers include acetoxy, alkoxy, and dialkylamino-terminated polysiloxanes. (For an overview on the synthesis of these polyether/polysiloxane block copolymers, see A. Noshay and J. E. McGrath; "Block Copolymers; Overview and Critical Survey"; Academic Press, New York, 1977; pp 400-401.)

The aforementioned polysiloxane-polyalkylene ether linear block copolymers are all synthesized by condensation polymerization, in which the terminal group on the polysiloxane oligomer is displaced by the hydroxyl group of the polyalkylene ether to produce the desired block copolymers having an Si—O—C linkage between the polysiloxane and polyalkylene oxide blocks of the copolymer. A low molecular weight by-product, resulting from displacement of the endgroup that was previously attached to the polysiloxane block, is liberated during the polycondensation reaction. This byproduct must either be removed from the polymer in an additional processing step, or allowed to remain in the block copolymer. In many polymer applications, these low molecular weight components can act as plasticizers, which detrimentally affect the polymer properties, and/or can slowly migrate out of the polymer over time presenting potential safety issues or detrimental performance (fogging or oily materials rising to the surface). Furthermore, as will be appreciated by those skilled in the art, polycondensations of this type are known to produce broad molecular weight distributions. The breadth of the molecular weight distribution is typically characterized by the polydispersity index, which is the ratio of weight average molecular weight ($M_w$) to number average molecular weight ($M_n$). For condensation polymerizations, Flory's theory has been used to derive a theoretical ratio of $M_w/M_n$ (polydispersity) of 1+p, where p is the extent of reaction. For high polymers, the extent of reaction approaches 1, so that the expected polydispersity is ~2.0, which has been experimentally verified for a number of condensation polymerizations. See, e.g., G. Odian, "Principles of Polymerization" 3rd edition, pp. 85-87, John Wiley and Sons, NY, 1991.

In order to overcome the aforementioned difficulties associated with the synthesis of polyether/polysiloxane block copolymers, Takeyasu et. al. (EP 0 485 637 B1; Asahi Glass Company Ltd.) describes preparation of PET/PDMS copolymers using Double Metal Cyanide (DMC) catalysts to alkoxylate hydroxyalkyl-terminated polydimethylsiloxanes. However, in their work, the use of silanol-terminated starting polydialkylsiloxanes is not disclosed.

U.S. Pat. No. 3,182,076 describes the preparation of organopolysiloxanes with carboxyalkyl terminal groups (not polymer chains) bound to the ends of the siloxane chains. Thus they aren't really block copolymers, but rather organopolysiloxanes terminated with carboxyalkyl groups. The linkage binding the organosiloxane components with the carboxyalkyl terminal groups are of the Si—C type. True block copolymers are not disclosed, nor is an Si—O—C linkage.

There exists therefore a need for polysiloxane-polyalkylene ether linear block copolymers having narrow polydispersity (<1.5) that do not contain low molecular weight by-products.

SUMMARY OF THE INVENTION

Accordingly, in one aspect the present invention provides a method of making a polyether-polydialkylsiloxane block copolymer, the method comprising:

i) providing a mixture comprising at least one alkylene oxide and at least one silanol-terminated polydialkylsiloxane; and ii) polymerizing the mixture in the presence of a double metal cyanide complex catalyst, and optionally in the presence of an aprotic solvent and/or an antioxidant.

In an additional aspect, the present invention provides polyether-polydialkylsiloxane block copolymers made by the above method. These polyether-polydialkylsiloxane block copolymers have a molecular weight of 150-50,000 g/mole and a polydispersity index of 1.0 to 1.5.

Surprisingly, it has been found that oxyalkylating silanol or polysilanol (Si—OH) terminated polysiloxanes in a double metal cyanide (DMC) catalyzed oxyalkylation process provides copolymers having the desired polydispersity, without low molecular weight by-products. In contrast to the above mentioned polycondensation routes to polysiloxane-polyalkylene ether block copolymers, this DMC catalyzed oxyalkylation is a polyaddition process and it results in linear polysiloxane-polyalkylene ether block copolymers having low polydispersity (<1.5) and does not produce any low molecular weight by-products.

DETAILED DESCRIPTION OF PREFERRED EMBODIMENTS

As used herein in the specification and claims, including as used in the examples and unless otherwise expressly specified, all numbers may be read as if prefaced by the word "about", even if the term does not expressly appear. Also, any numerical range recited herein is intended to include all subranges subsumed therein.

As used herein, the term "alkylene oxide" refers to epoxide-containing compounds. Some examples of suitable alkylene oxides include ethylene oxide, propylene oxide, 1,2-butylene oxide, 2,3-butylene oxide, and styrene oxide. Mixtures of two or more alkylene oxides can also be used. Preferred alkylene oxides are ethylene oxide, propylene oxide, 1,2-butylene oxide and 2,3-butylene oxide, or mixtures of these. The alkylene oxide will be present in an amount ranging from 1-99 wt. %, preferably 25-75 wt. %, based on the weight of the silanol-terminated polydialkylsiloxane and alkylene oxide together, and excluding catalyst.

The silanol-terminated polydialkylsiloxane is a compound of the formula:

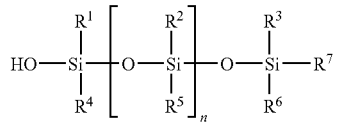

where $R^1$ to $R^6$ are each independently a $C_1$-$C_6$ alkyl group, $R^7$ is an —OH, hydrogen or $C_1$-$C_6$ alkyl group and n is an integer from 0 to 100. Preferably, n is an integer between 3 and 60. The polydialkylsiloxane has a molecular weight of between 100-8,000 g/mole, more preferably a molecular weight between 400-5,000 g/mole.

The silanol-terminated polydiakylsiloxane will be present in an amount ranging from 1-99 wt. %, preferably 25-75 wt. %, based on the weight of the silanol-terminated polydialkylsiloxane and alkylene oxide together, and excluding catalyst.

Polymerization is carried out in the presence of a double metal cyanide (DMC) catalyst. Use of DMC catalysts in the preparation of polyether polyols is well known in the art. Suitable examples of methods for the preparation of DMC catalysts and the use thereof in the manufacture of polyether polyols can be found in U.S. Pat. Nos. 3,278,457, 3,404,109, 3,941,849 and 5,158,922, 5,482,908, 5,783,513, 6,613,714, 6,855,658, the entire contents of which are incorporated herein by reference thereto.

As those skilled in the art are aware, DMC catalysts are made by the reaction of hexacyanometallate salts with transition metal salts in the presence of suitable complexing organic ligands and optionally with functionalized polymers or other processing aids to produce a compound with the formula given below:

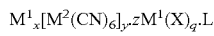

wherein, $M^1$ represents a metal selected from the group consisting of $Zn^{+2}$, $Fe^{+2}$, $Ni^{+2}$, $Mn^{+2}$, $Co^{+2}$, $Sn^{+2}$, $Pb^{+2}$, $Fe^{+3}$, $Mo^{+4}$, $Mo^{+6}$, $Al^{+3}$, $V^{+4}$, $V^{+5}$, $Sr^{+2}$, $W^{+4}$, $W^{+6}$, $Cu^{+2}$ and $Cr^{+3}$;

$M^2$ represents a metal selected from the group consisting of $Fe^{+2}$, $Fe^{+3}$, $Co^{+2}$, $Co^{+3}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$ and $V^{+5}$;

X represents an anion selected from the group consisting of halide, hydroxide, sulfate, carbonate, cyanide, thiocyanide, carboxylate, or nitrate;

L represents an organic ligand; and x, y, and q are chosen to maintain electroneutrality.

Preferred for use in the present invention are those zinc hexacyanocobaltate catalysts prepared by the methods described in U.S. Pat. No. 5,482,908, the entire contents of which are incorporated herein by reference thereto. The DMC catalyst may also be bound to a support as described in U.S. Pat. No. 6,362,126, also incorporated herein by reference. A particularly preferred catalyst is a zinc hexacyanocobaltate complex with a polyalkylene glycol.

The catalyst concentration is 10-5,000 ppm, preferably 25-2,500 ppm, most preferably 50-500 ppm, in each case based on the weight of the product. The reaction times for the polymerization are in the range from a few minutes to several days, preferably a few hours.

Polymerization of the monomer mixture may be carried out in a semi-batch mode or continuously, using the continuous addition of starter (CAOS) method.

In the semi-batch process, the DMC catalyst and starter (the silanol-terminated polydialkylsiloxane) and optionally a solvent (and/or heel of the product or similar product to what one is preparing) are charged to the reactor and heated under vacuum to de-water. A portion of the alkylene oxide is fed into the reactor, while monitoring the reactor pressure. Once the catalyst has become active, evident by a drop in reactor pressure, the remaining alkylene oxide is continuously added in metered amounts until the desired molecular weight of the polyether-polydialkylsiloxane block copolymer is attained.

The CAOS method differs from the semi-batch method only in that not all of the silanol terminated polydialkyldiloxane starter is charged into the reactor initially. Thus, in addition to the alkylene oxide, a portion or all of the starter is continuously fed into the reactor during the alkoxylation. The feed rates are typically adjusted so that the starter feed is completed prior to feeding all of the alkylene oxide. If desired, additional DMC catalyst can also be metered in during the alkoxylation. CAOS methods are described in detail in U.S. Pat. No. 5,777,177, and are well known in the art.

With both the semi-batch and CAOS methods, a "heel" process may be employed. In a heel process, the initial charge to the reactor contains, in addition to the catalyst and any starter compound, either the product or a material similar to the product one is preparing. The "heel" has the advantage of serving as a carrier for the catalyst and any starter that is initially charged. It is particularly useful for high melting, solid or very viscous starters, and has the advantage over a solvent that it does not need to be removed from the product.

Polymerization of the mixture, catalyzed by the highly active DMC catalysts, generally proceeds at temperatures of 20 to 200° C., preferably in the range from 60 to 150° C., particularly preferably at temperatures of 90 to 140° C. The reaction may be performed at total pressures of 0.001 to 20 bar. Polymerization may be performed without solvent or in an inert (aprotic) organic solvent, such as, for example, toluene, xylene, tetrahydrofuran, 1,2-dimethoxyethane, methyl tetrahydrofuran, dioxane, benzene, hexane or other suitable solvent, as would be known to one skilled in the art. If used, the quantity of solvent is conventionally 5 to 80 wt. % relative to the quantity of the polyether to be produced. The reaction is preferably performed without solvent. The yield of polyether-polydialkylsiloxane block copolymer produced in the present invention is greater than 95%, preferably greater than 97%, more preferably >99% and is determined by subtracting the weight % of residual monomers detected in the product from 100%.

The above process produces a polyether-polydialkylsiloxane block copolymer having a molecular weight of 150-50,000 g/mole and having a polydispersity index of 1.0 to 1.5. Preferably, the polyether-polydialkylsiloxane block copolymer has a molecular weight of 400-10,000 g/mole. The polydialkylsiloxane content of the block copolymer is between 25-75 wt. %, based on the weight of the copolymer. In some embodiments, the polydialkylsiloxane is a disilanol and the copolymer is an ABA block copolymer. In other embodiments, the polydialkylsiloxane is a monosilanol and the copolymer is an AB block copolymer.

The block copolymers of the present invention can be used in adhesives, for example, including reactive polyurethane hot melt adhesives. Polyurethane hot melt adhesives are typically prepared from isocyanate-capped polyester prepolymers which are the reaction products of an isocyanate compound and a polyester polyol. The prepolymer is of low NCO content, usually less than 3%, and is a solid at room temperature.

The term "isocyanate compound" as used herein refers to a monomeric small molecule having 2 or more —NCO groups. Isocyanate compounds useful for forming the prepolymer compositions of the invention include organic, aliphatic and aromatic isocyanate compounds having an isocyanate functionality of about 2 or more. The isocyanate compound can have from 1 to 10 aliphatic or aromatic groups substituted by the isocyanate group. The isocyanate compounds can also contain other substituents which do not substantially adversely affect the viscosity of the isocyanate terminated prepolymers, the adhesive properties of the bond line or the reactivity of the —NCO groups during the formation of the prepolymer. The isocyanate compound can also comprise mixtures of both aromatic and aliphatic isocyanates and isocyanate compounds having both aliphatic and aromatic character.

Typical aromatic isocyanate compounds include diphenylmethane diisocyanate compounds (MDI) including its isomers, carbodiimide modified MDI, diphenylmethane-4,4'-diisocyanate, diphenylmethane-2,2'-diisocyanate, diphenylmethane-2,4'-diisocyanate, oligomeric phenyl methylene isocyanates; toluene diisocyanate compounds (TDI) including isomers thereof, tetramethylxylene diisocyanate (TMXDI), isomers of naphthylene diisocyanate, isomers of triphenylmethane triisocyanate, and mixtures thereof. Aliphatic di, tri, and polyisocyanates are also useful including for example isophorone diisocyanate, hydrogenated aromatic diisocyanates, aliphatic polyisocyanates, cycloaliphatic polyisocyanates, and others. A preferred isocyanate is MDI.

The term "polyester glycol" as used herein refers to a polyester having 2 terminal OH groups. Preparation is by known routes, either from a) aliphatic hydroxycarboxylic acids, or from b) aliphatic dicarboxylic acids having from 6 to 12 C atoms and—particularly even-numbered—diols having from 2 to 8 C atoms. Other appropriate derivatives may also be used, e.g., lactones, methyl esters or anhydrides. Some examples of starting materials include: 1,2-ethylene glycol, 1,4-butanediol, 1,6-hexanediol, adipic, azelaic and sebacic acids and lactones. The acid component may include up to 25% on a molar basis of other acids, for example, cyclohexanedicarboxylic acid, terephthalic acid and isophthalic acid. The glycol component may include up to 15% on a molar basis of other diols, for example, diethylene glycol and 1,4-cyclohexane-dimethanol. In addition to homopolymers from the above components, copolyesters from the following components or derivatives thereof can also be used: adipic acid, isophthalic acid, phthalic acid, and butanediol; adipic acid, phthalic acid and hexanediol; adipic acid, isophthalic acid, phthalic acid, ethylene glycol, neopentylglycol, and 3-hydroxy-2,2-dimethylpropyl-3-hydroxy-2,2-dimethyl propanoate; and adipic acid, phthalic acid, neopentylglycol, and ethylene glycol.

The polyester glycols are either liquid or solid. When solid, they are preferably amorphous. However, they can also be weakly crystalline. Preferably, a mixture of partially crystalline and amorphous polyesters is employed. However, crystallinity is developed so weakly that it does not show by way of opaqueness in the final hot-melt adhesive. The melting point of the partially crystalline polyester is in the range of from 40 to 70° C., preferably in the range of from 45 to 65° C. The melting point indicates the temperature at which the crystalline regions of the material are melting. It is determined by differential thermoanalysis through the main endothermic peak. Preferably, a polybutanediol adipate having a molecular weight of about 3,500 and a melting point of about 50° C. is used as the partially crystalline polyester glycol.

The average molecular weight (Mn) of the polyester glycol should be between 1,500 and 30,000, preferably between 2,500 and 6,000. It is calculated from the OH number. The molecular weight of the polyester glycol is of some significance: increasing molecular weight makes extrusion of the hot-melt adhesive and penetration into leather more difficult, and decreasing molecular weight results in the hot-melt adhesive being not sufficiently solid at room temperature.

The polyester glycols preferably have a glass transition temperature (Tg) in the range of −40° C. to +50° C. and, in particular, from −40° C. to +40° C. The Tg is determined on the basis of DSC measurements as the center point of the step using a ratio of 10° C./min in the second run.

Particularly suitable polyester glycols include those having a glass transition temperature of about −40° C. to +40° C., a viscosity of about 3,000 to about 30,000 mPa·s at 130° C. (Brookfield, RVDV II+Thermocell) and a hydroxyl number of about 27 to 60.

In conventional hot-melt adhesives non-crystalline polyester polyols and polyether polyols can also optionally be used to add to the polymer backbone and to provide other properties in the adhesive composition. In the context of the present invention, the polyether-polydialkylsiloxane copolymers are used in place of a polyether polyol, in amounts up to 5 wt. % of the total weight of the hot melt adhesive.

The polyether-polydialkylsiloxane copolymers of the present invention can also be used in low surface energy coatings and as mold release agents for polycarbonate materials.

EXAMPLES

The following examples are intended to illustrate the invention and should not be construed as limiting the invention in any way. The materials described below were used in carrying out the examples of this invention:

DMC Catalyst: zinc hexacyanocobaltate complex with polyalkylene glycol prepared using the procedure described in U.S. Pat. No. 5,482,908, example 3.

Disilanol Terminated Polydimethylsiloxanes: A series of commercially available disilanol terminated polydimethylsiloxanes were purchased from Gelest, Inc. of Morrisville, Pa. A description of the materials used in the examples is provided in the table below:

| Product | OH# (Specification) | OH# (Measured by titration) | Visc. (cSt) |
| --- | --- | --- | --- |
| Gelest DMS-S12 | 129-247 | 189 | 23 |
| Gelest DMS-S14 | 99-132 | 106 | 40 |
| Gelest DMS-S15 | 30-40 | 34 | 85 |
| Gelest DMS-S21 | 28 | 28 | 110 |

Acclaim® 2200: A 2000 MW polypropylene glycol produced by a DMC catalyzed process commercially available from Bayer MaterialScience LLC of Pittsburgh, Pa.

Acclaim® 4200: A 4000 MW polypropylene glycol produced by a DMC catalyzed process commercially available from Bayer MaterialScience LLC of Pittsburgh, Pa.

Multranol® 3600: a 2000 MW polypropylene glycol produced by a KOH catalyzed process commercially available from Bayer MaterialScience LLC of Pittsburgh, Pa.

Arcol® Polyol PPG 2000: a 2000 MW polypropylene glycol commercially available from Bayer MaterialScience LLC of Pittsburgh, Pa.

EO: Ethylene oxide

PO: Propylene oxide

Desmophen® S 105-30: a difunctional polyester polyol having an OH# of 28 available commercially from Bayer MaterialScience LLC of Pittsburgh, Pa.

Mondur® M: 4,4' diphenylmethanediisocyanate available commercially from Bayer MaterialScience LLC of Pittsburgh, Pa.

RC 6135 Catalyst: 2,2'-dimorpholinodiethylether available commercially from Rhein Chemie, member of the Lanxess Group.

Synthesis of Polyether/Polysiloxane Copolymers by the Semi-Batch Process

Polyether-polydialkylsiloxane copolymers were produced in a semi-batch process in a polyether polyol reactor using the general procedure described below: Details on the synthesis of each example are provided in Table 1 below.

The polyether polyol reactor was equipped with mechanical agitation, heating and cooling via a hot oil jacket and internal water circulating cooling coils, respectively. The reactor system was also equipped with three separate feed streams, which could be independently controlled and metered to allow multiple feeds to the reactor. Also, a nitrogen inlet led to a dip tube which was used to purge the reactor with nitrogen. Finally, a vacuum inlet, allowed one to evacuate the reactor to the desired pressure level. The entire system was computer interfaced to allow precise temperature, pressure, and feed rate control.

Into the above described reactor was charged the indicated disilanol terminated polydimethyl siloxane starter and the DMC catalyst. The reactor contents were charged into the reactor and stripped under full vacuum, with stirring (500 rpm) and a nitrogen sparge for 30 minutes at 130° C. Following this vacuum stripping procedure, the reactor was blocked by closing the valves to the vacuum pump and nitrogen sparge. A small portion of the indicated oxide, referred to as an activation charge, was added to the reactor over a 5 minute period. After the catalyst had become active, as evidenced by a halving of the partial pressure due to the oxide, the oxide feed was resumed at the indicated rate. Both the activation feed and oxide feed stages were run at a reaction temperature of 130° C. After the oxide feed was complete, the reaction mixture was allowed to continue stirring at 130° C. for an additional 30 minutes, and subsequently stripped (130° C.) under full vacuum with a nitrogen sparge for 30 minutes, prior to cooling and draining the product.

TABLE 1

Synthesis of Dihydroxyl Functional Polyether/
Polydimethylsiloxane/Polyether ABA Block Copolymers
by the Semi-batch Process of the Invention

| Ex. # | Product Description | Starter (Type; g) | Catalyst (g; ppm) | Activation Charge (Type; g) | Oxide Feed (Type; g) | Oxide Feed Rate (g/min) |
|---|---|---|---|---|---|---|
| Ex. 1 | 6.6K PPO/PDMS/PPO (50 wt. % PDMS) | S-15; 400 | 0.4; 500 | PO; 30 | PO; 370 | 4 |
| Ex. 2 | 8K PPO/PDMS/PPO (50 wt. % PDMS) | S-21; 400 | 0.16; 200 | PO; 30 | PO; 370 | 4 |
| Ex. 3 | 16K EO/PDMS/EO (25 wt. % PDMS) | S-21; 200 | 0.16; 200 | PO; 25 | EO; 575 | 5 |
| Ex. 4 | 16K PO/PDMS/PO (25 wt. % PDMS) | S-21; 200 | 0.16; 200 | PO; 25 | PO; 575 | 5 |

A description and analytical properties of the four copolymers produced using the semi-batch process are tabulated below (Table 2).

TABLE 2

Characterization of Dihydroxyl Functional Polyether/
Polydimethylsiloxane/Polyether ABA Block Copolymers Produced
by the Semi-batch Process of the Invention

| Ex. # | Product Description | OH# (Theo) | OH# (Exp) | Visc. (cSt) | Mn | Mw | PDI | Surface Tension (dynes/cm) |
|---|---|---|---|---|---|---|---|---|
| Ex. 1 | 6.6K PPO/PDMS/PPO (50 wt. % PDMS) | 17.0 | 16.9 | 356 | 4543 | 5979 | 1.32 | 21.8 |
| Ex. 2 | 8K PPO/PDMS/PPO (50 wt. % PDMS) | 14.0 | 13.9 | 1120 | 5809 | 7736 | 1.33 | 21.9 |
| Ex. 3 | 16K EO/PDMS/EO (25 wt. % PDMS) | 7.0 | 8.9 | solid | 9142 | 12184 | 1.33 | — |

TABLE 2-continued

Characterization of Dihydroxyl Functional Polyether/
Polydimethylsiloxane/Polyether ABA Block Copolymers Produced
by the Semi-batch Process of the Invention

| Ex. # | Product Description | OH# (Theo) | OH# (Exp) | Visc. (cSt) | Mn | Mw | PDI | Surface Tension (dynes/cm) |
|---|---|---|---|---|---|---|---|---|
| Ex. 4 | 16K PO/PDMS/PO (25 wt. % PDMS) | 7.0 | 8.6 | 12037 | 9918 | 11241 | 1.13 | — |

Mn, and Mw were measured by GPC using polystyrene standards.
PDI is Mw/Mn

The surface energy of representative copolymers (Examples 1 and 2) was measured at ~22 dynes/cm. Thus these materials have surface tension similar to those of a silicone/PET surfactant. (E.g. OSI-4340 and OSI Y-10762 surfactants which have surface tensions of 21.6 and 22.2 dynes/cm, respectively). For comparison, Multranol®-3600, a difunctional polypropylene glycol has a value of 33.4 dynes/cm.

Synthesis of Polyether/Polysiloxane Copolymers by the CAOS Process

Polyether-polydialkylsiloxane copolymers were produced in a Continuous Addition of Starter (CAOS) process following the general procedure described below using the same polyether polyol reactor as described for the semi-batch process. Details on the synthesis of each of the CAOS produced examples are provided in Table 3 below.

For preparation of samples by the CAOS method, each product was prepared by co-feeding PO and the indicated disilanol terminated PDMS (Gelest products) into a "heel" of either Acclaim® 4200 (for the 4000 MW products) or Acclaim® 2200 (for the 2000 MW products) to make the first generation of products. This first generation product was subsequently charged in the reactor as the heel to make second generation block copolymer products. In either case, the reactor was first charged with the indicated type and amount of "heel" and the DMC catalyst as described in Table 3. The reactor contents were heated under full vacuum, with stirring (500 rpm) and a nitrogen sparge for 30 minutes at 130° C. Following this vacuum stripping, the reactor was blocked by closing the valves to the vacuum pump and nitrogen sparge. A small portion of the indicated oxide, referred to as an activation charge, was added to the reactor over a 5 minute period. After the catalyst had become active, as evidenced by a halving of the partial pressure due to the oxide, the oxide and CAOS feeds were started at the indicated rates. The CAOS feed in all cases refers to the indicated Gelest disilanol terminated polydimethyl siloxane. Both the activation feed and oxide/CAOS feed stages were run at a reaction temperature of 130° C. The disilanol feed was fed at a rate sufficient to complete this CAOS feed prior to the completion of the oxide feed, so that a pure oxide feed was added toward the end of the run. After the oxide feed was complete, the reaction mixture was allowed to continue stirring at 130° C. for an additional 30 minutes, and subsequently stripped (130° C.) under full vacuum with a nitrogen purge for 30 minutes, prior to cooling and draining the product.

TABLE 3

Synthesis of Dihydroxyl Functional
Polyether/Polydimethylsiloxane/Polyether ABA Block Copolymers by
the CAOS Process of the Invention*

| Ex. # | Product Description | Heel (Type; g) | Catalyst (g; ppm) | Activation Charge (Type; g) | CAOS Feed (Type; g; g/min) | PO Feed (g; g/min.) |
|---|---|---|---|---|---|---|
| Ex. 5 | 4K PPO/PDMS/PPO ABA Block Copolymer (25 wt. % PDMS) 1st generation | Acclaim® 4200; 200 | 0.2; 250 | PO; 50 | S-14; 150; 1.5 | 400; 4 |
| Ex. 6 | 4K PPO/PDMS/PPO ABA Block Copolymer (25 wt. % PDMS) - 2nd generation. | Ex. 5; 200 | 0.2; 250 | PO; 50 | S-14; 150; 2.0 | 400; 4 |
| Ex. 7 | 2K PPO/PDMS/PPO ABA Block Copolymer (50 wt. % PDMS) 1st generation | Acclaim® 2200; 200 | 0.2; 250 | PO; 20 | S-14; 300; 3.0 | 280; 2.3 |
| Ex. 8 | 2K PPO/PDMS/PPO ABA Block Copolymer (50 wt. % PDMS) - 2nd generation | Ex. 7; 200 | 0.2; 250 | PO; 20 | S-14; 300; 3.0 | 280; 2.3 |

TABLE 3-continued

Synthesis of Dihydroxyl Functional
Polyether/Polydimethylsiloxane/Polyether ABA Block Copolymers by
the CAOS Process of the Invention*

| Ex. # | Product Description | Heel (Type; g) | Catalyst (g; ppm) | Activation Charge (Type; g) (g) | CAOS Feed (Type; g; g/min) | PO Feed (g; g/min.) |
|---|---|---|---|---|---|---|
| Ex. 9 | 2K PPO/PDMS/PPO ABA Block Copolymer (30 wt. % PDMS) 1st generation | Acclaim ® 2200; 200 | 0.2; 250 | PO; 20 | S-12; 178; 1.78 | 402; 3.2 |
| Ex. 10 | 2K PPO/PDMS/PPO ABA Block Copolymer (30 wt. % PDMS) 2nd generation | Ex. 9; 200 | 0.2; 250 | PO; 20 | S-12; 178; 1.78 | 402; 3.2 |

*All examples in Table 3 were prepared using (PO) as the only oxide.

Details on the characterization of the products prepared using the CAOS process are shown in Table 4.

TABLE 4

Characterization of Dihydroxyl Functional
Polyether/Polydimethylsiloxane/Polyether ABA Block Copolymers
produced by the CAOS Process of the Invention

| Ex. # | Product Description | OH# (Theo) | OH# (Exp) | Visc. (cSt) | Mn | Mw | PDI |
|---|---|---|---|---|---|---|---|
| Ex. 5 | 4K PPO/PDMS/PPO ABA Block Copolymer (25 wt. % PDMS) 1st generation | 26.9 | 25.9 | 567 | 3407 | 4131 | 1.21 |
| Ex. 6 | 4K PPO/PDMS/PPO ABA Block Copolymer (25 wt. % PDMS) - 2nd generation | 26.6 | 24.2 | 469 | 3013 | 3922 | 1.30 |
| Ex. 7 | 2K PPO/PDMS/PPO ABA Block Copolymer (50 wt. % PDMS) 1st generation | 53.8 | 49.7 | 139 | 1138 | 1184 | 1.04 |
| Ex. 8 | 2K PPO/PDMS/PPO ABA Block Copolymer (50 wt. % PDMS) - 2nd generation | 53.2 | 49.2 | 98 | 1202 | 1269 | 1.06 |
| Ex. 9 | 2K PPO/PDMS/PPO ABA Block Copolymer (30 wt. % PDMS) 1st generation | 56.1 | 52.8 | 150 | 1455 | 1965 | 1.35 |
| Ex. 10 | 2K PPO/PDMS/PPO ABA Block Copolymer (30 wt. % PDMS) $2^{nd}$ generation | 56.1 | 53.0 | 120 | 1153 | 1589 | 1.38 |

Mn, and Mw were measured by GPC using polystyrene standards.
PDI is Mw/Mn

Use of PET/PDMS/PET Block Copolymers in Reactive Hot Melt Adhesives

Representative PET/PDMS/PET block copolymers were evaluated in reactive hot melt adhesive formulations. The general procedure for the preparation of the hot melt adhesives is given below, with specific details on each formulation provided in Table 5. The reactive hot melt adhesive control was prepared by combining Desmophen® S-105-30 (83.6 parts) and PPG-2000 (5 parts) in a 3-necked flask equipped with mechanical stirring and a vacuum take-off. The mixture was heated to 110° C. under full vacuum for 3 hours to de-gas and de-water the raw materials. The mixture was allowed to cool to 85° C. prior to adding Mondur® M (11.2 parts) in the form of a flaked solid. After heating (85-90° C.) and stirring this mixture under a nitrogen atmosphere for 2 hours, RC 6135 catalyst (0.2 parts) was added. The resins were allowed to heat and stir an additional 30 minutes after addition of the catalyst prior to titrating (n-butyl amine titration) for isocyanate content. Additional formulations in which the PPG-2000 was replaced by the PET/PDMS/PET ABA block copolymers of the invention were prepared for comparison with the control.

TABLE 5

Formulation of Reactive Hot Melt Adhesives Containing PET/PDMS Copolymers

|  | Ex. 11 | Ex. 12 | Ex. 13 | Ex. 14 | Ex. 15 |
|---|---|---|---|---|---|
| Desmophen ® S 105-30 | 83.6 | 83.6 | 83.6 | 83.6 | 83.6 |
| Mondur ® M | 11.2 | 11.2 | 11.2 | 11.2 | 11.2 |
| RC 6135 Catalyst | 0.2 | 0.2 | 0.2 | 0.2 | 0.2 |
| Arcol ® Polyol PPG 2000 | 5.0 | | | | |
| PET/PDMS/PET Block copolymer from Example 2 | | | | | |
| (8000 MW PPO/PDMS/(50 wt. % PDMS) PET/PDMS/PET Block copolymer from Example 1 | | 5.0 | | | |
| (6600 MW PPO/PDMS/PPO (50 wt. % PDMS) PET/PDMS/PET Block copolymer from Example 6 | | | 5.0 | | |
| (4K PPO/PDMS/PPO (25 wt. % PDMS) PET/PDMS/PET Block copolymer from Example 7 | | | | 5.0 | |
| (2K PPO/PDMS/PPO (50 wt. % PDMS) | | | | | 5.0 |
| Isocyanate (wt. % NCO) | 1.75 | 1.82 | 1.88 | 1.89 | 1.79 |

The adhesive formulations described in Table 5 were evaluated for adhesive bond strength formed between wood and various plastics. The results of these tests with four different plastic substrates are summarized in Table 6 below. Of particular note was the improved adhesion achieved between Pocan® and wood using the 8K PET/PDMS copolymer of Example 2. Pocan® (polybutylene terephthalate) is generally difficult to adhere to because of its low surface energy (32 dynes/cm).

TABLE 6

Overlap Shear Bond Strength of Wood/Plastic Using Hot Melt Adhesives Modified with PET/PDMS Copolymers

|  | Description | Pocan ®/Wood | Durethan/Wood | Acrylic/Wood | TPO (corona treated)/Wood |
|---|---|---|---|---|---|
| Ex. 11 | Control | One fell apart | 242 | 305 | 277 |
|  |  | 2.9 | 164 | 301 | 276 |
|  |  | 431.7 | 261 | 226 | 281 |
|  |  |  | Avg. 222 | Avg. 278 | Avg. 278 did not break apart (TPO bent) |
| Ex. 11 re-test | Control Re-test | One fell apart | 336 | 440 | 331 |
|  |  | 620 | 350 | 328 | 343 |
|  |  | 22 | 293 | 578 | 342 |
|  |  |  | Avg. 327 | Avg. 449 | Avg. 339 did not break apart (TPO bent) |
| Ex. 12 | 8K PET/PDMS (50% siloxane) | 1017 did not break | 238 | 314 acrylic cracked | 291 |
|  |  | 759 | 304 | 459 acrylic cracked | 293 |
|  |  | 583 wood cracked before sample did | 345 | 409 | 287 |
|  |  | Avg. 786 | Avg. 295.7 | Avg. 394 | Avg. 290 did not break apart (TPO bent) |

TABLE 6-continued

Overlap Shear Bond Strength of Wood/Plastic Using Hot
Melt Adhesives Modified with PET/PDMS Copolymers

| | Description | Pocan ®/ Wood | Durethan/ Wood | Acrylic/ Wood | TPO (corona treated)/ Wood |
|---|---|---|---|---|---|
| Ex. 12 re-test | 8K PET/PDMS (50% siloxane) (Re-test) | 521 333 768 Avg. 541 1019 307 1020 Avg. 782 | 374 387 298 Avg. 353 | 380 acrylic cracked 321 acrylic cracked 535 Avg.412 | 328 325 283 Avg. 312 did not break apart (TPO bent) |
| Ex. 13 | 6.6K PET/PDMS (50% siloxane) | 39 2 samples fell apart Avg. 39 | 269 266 306 Avg. 280 | 459 acrylic cracked 632 597 acrylic cracked Avg. 563 | 293 291 137 Avg. 240 They all pulled apart while testing |
| Ex. 14 | 4K PET/PDMS (25% siloxane) | 7 2 one fell apart Avg. 5 | 252 2 fell apart Avg. 252 | 469 acrylic cracked 5279 acrylic cracked 469 Avg. 488 | 276 2 fell apart Avg. 276 did not break apart (TPO bent) |
| Ex. 15 | 2K PET/PDMS (50% siloxane) | 6 2 fell apart while putting in Instron Avg. 6 | 106 168 1 fell apart while removing from Jig Avg. 137 | 409 442 402 All acrylics cracked Avg. 417 | 293 288 1 fell apart while removing from Jig Avg. 291 did not break apart (TPO bent) |

Whereas particular embodiments of this invention have been described above for purposes of illustration, it will be evident to those skilled in the art that numerous variations of the details of the present invention may be made without departing from the invention as defined in the appended claims.

What is claimed is:

1. A method of making a polyether-polydialkylsiloxane block copolymer comprising:
   i) providing a mixture comprising at least one alkylene oxide and at least one silanol-terminated polydialkylsiloxane; and
   ii) polymerizing the mixture in the presence of a double metal cyanide complex catalyst, and optionally in the presence of an aprotic solvent and/or an antioxidant; wherein the polydispersity index of the copolymer is between 1.0 and 1.5.

2. The method of claim 1, wherein the alkylene oxide is selected from the group consisting of ethylene oxide, propylene oxide, 1,2-butylene oxide, 2,3-butylene oxide, styrene oxide, and mixtures thereof.

3. The method of claim 1, wherein the silanol-terminated polydialkylsiloxane is a compound of the formula:

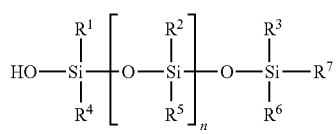

where
$R^1$ to $R^6$ are each independently a $C_1$-$C_6$ alkyl group,
$R^7$ is an —OH, or $C_1$-$C_6$ alkyl group and
n is an integer from 0 to 100.

4. The method of claim 3, wherein n is an integer between 3 and 60.

5. The method of claim 3, wherein the silanol-terminated polydialkylsiloxane has a molecular weight of about 100-8,000 g/mole.

6. The method of claim 3, wherein the silanol-terminated polydialkylsiloxane has a molecular weight of about 400-5,000 g/mole.

7. The method of claim 1, wherein the polymerization is carried out at from 60° to 150° C.

8. The method of claim 1, wherein the polymerization is carried out at from 90-140° C.

9. The method of claim 1, wherein the alkylene oxide and silanol-terminated polydialkylsiloxane are present in the following amounts: 1-99 wt. % silanol-terminated polydialkylsiloxane, the balance being alkylene oxide, where the amounts of the two compounds together add up to 100 wt. %.

10. The method of claim 1, wherein the alkylene oxide and silanol-terminated polydialkylsiloxane are present in the following amounts: 25-75 wt. % silanol-terminated polydialkylsiloxane, the balance being alkylene oxide, where the amounts of the two compounds together add up to 100 wt. %.

11. The method of claim 1, wherein the catalyst is a zinc hexacyanocobaltate complex with a polyalkylene glycol.

12. The method of claim 1, wherein the method is carried out according to the continuous addition of starter method.

13. The method of claim 1, wherein the method is carried out in a semi-batch method.

14. A polyether-polydialkylsiloxane block copolymer having a molecular weight of 150-50,000 g/mole and having a polydispersity index of 1.0 to 1.5.

15. The polyether-polydialkylsiloxane block copolymer of claim 14, having a molecular weight of 400-10,000 g/mole.

16. The polyether-polydialkylsiloxane block copolymer of claim 14, having a polydialkylsiloxane content of 25-75 wt. %, based on the weight of the copolymer.

17. The polyether-polydialkylsiloxane block copolymer of claim 14, wherein the polydialkylsiloxane is a disilanol and the copolymer is an ABA block copolymer.

18. The polyether-polydialkylsiloxane block copolymer of claim 14, wherein the polydialkylsiloxane is a monosilanol and the copolymer is an AB block copolymer.

19. An adhesive composition comprising a polyether-polydialkylsiloxane block copolymer of claim 14.

20. The adhesive composition of claim 19 in which the block copolymer is an isocyanate terminated prepolymer.

21. The adhesive composition of claim 19 in which the block copolymer is an isocyanate terminated prepolymer comprising a polyester polyol.

22. A low surface energy coating comprising a polyether-polydialkylsiloxane block copolymer of claim 14.

23. A mold release agent for polycarbonate materials comprising a polyether-polydialkylsiloxane block copolymer of claim 14.

* * * * *